United States Patent
Verbrugh et al.

(10) Patent No.: US 11,737,198 B2
(45) Date of Patent: Aug. 22, 2023

(54) LIGHTING DEVICE

(71) Applicant: SIGNIFY HOLDING B.V., Eindhoven (NL)

(72) Inventors: Stefan Marcus Verbrugh, Eindhoven (NL); Marek Zbigniew Szczerba, Eindhoven (NL); Evren Ozcan, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 115 days.

(21) Appl. No.: 17/603,839

(22) PCT Filed: Apr. 15, 2020

(86) PCT No.: PCT/EP2020/060576
§ 371 (c)(1),
(2) Date: Oct. 14, 2021

(87) PCT Pub. No.: WO2020/212413
PCT Pub. Date: Oct. 22, 2020

(65) Prior Publication Data
US 2022/0201828 A1    Jun. 23, 2022

(30) Foreign Application Priority Data
Apr. 18, 2019  (EP) .................... 19170272

(51) Int. Cl.
  H05B 47/19   (2020.01)
  H05B 47/29   (2020.01)
  H05B 47/105  (2020.01)

(52) U.S. Cl.
  CPC ........... *H05B 47/19* (2020.01); *H05B 47/105* (2020.01); *H05B 47/29* (2020.01)

(58) Field of Classification Search
  CPC ........ G08C 17/00; H04B 10/116; H04Q 9/00; H05B 45/00; H05B 47/00; H05B 47/105; H05B 47/19; H05B 47/20; H05B 47/29; Y02B 20/40
  See application file for complete search history.

(56) References Cited

U.S. PATENT DOCUMENTS

| | | | |
|---|---|---|---|
| 9,131,550 B2 | 9/2015 | Schenk et al. | |
| 10,009,100 B2 | 6/2018 | Jovicic et al. | |
| 2018/0214706 A1 | 8/2018 | Kutek | |
| 2018/0269970 A1* | 9/2018 | Jovicic | ............. H04L 7/041 |
| 2019/0007135 A1 | 1/2019 | Stout et al. | |
| 2020/0302721 A1* | 9/2020 | Koo | ............. H04B 10/1149 |
| 2023/0051528 A1* | 2/2023 | Banhegyesi | ....... H01H 71/0228 |

* cited by examiner

*Primary Examiner* — Raymond R Chai

(57) ABSTRACT

The invention provides a lighting device comprising a transmitter, a controller and a sensor; wherein the controller is configured to control the transmitter to repeatedly transmit a second wireless message interleaved with a first wireless message, wherein the first wireless message has a first duration and comprises a first signal, wherein the second wireless message has a second duration and comprises a second signal; wherein the first duration and/or the second duration is adaptive during a lifetime of the lighting device; wherein the controller is configured to receive a measurement from the sensor and control the transmitter to transmit the second wireless message comprising the second signal comprising the measurement.

15 Claims, 3 Drawing Sheets

LIGHTING DEVICE

CROSS-REFERENCE TO PRIOR APPLICATIONS

This application is the U.S. National Phase application under 35 U.S.C. § 371 of International Application No. PCT/EP2020/060576, filed on Apr. 15, 2020, which claims the benefit of European Patent Application No. 19170272.9, filed on Apr. 18, 2019. These applications are hereby incorporated by reference herein.

FIELD OF THE INVENTION

The invention relates to a lighting device and a corresponding method of lighting device transmitting a signal. The invention further relates to a location-based services system; and to a computer program product.

BACKGROUND OF THE INVENTION

More and more lighting devices are equipped with wireless connectivity for providing a function beyond mere illumination such as e.g. enabling lighting control or providing location based services, facilitating communication, allowing commissioning, providing location-based services and/or indoor positioning, etc. For example, Visible Light Communication is implemented (by Signify) to provide luminaires with an indoor positioning functionality. For this purpose, the luminaire may transmit a 16-bit code referred to as a VLC identifier, i.e. to allow positioning via e.g. triangulation using the VLC identifiers. Similarly, a Bluetooth-ZigBee combo-chip is e.g. used (by Signify) to enable the functionality of lighting control via said wireless communication modalities. Further, a lighting device may also transmit its status information wirelessly.

However, lighting devices equipped with wireless connectivity may cope with conflicts when attempting to provide multiple functions simultaneously via the same wireless connection. For example, the function of indoor positioning may require a continuous beaconing of identifiers for accurate positioning, which conflicts with using the same beaconing for e.g. providing operational status information.

Document (US2018/269970A1) discloses an interleaving signal emitted from a light source using VLC.

SUMMARY OF THE INVENTION

It is an object of the invention to provide an improved lighting device, which at least alleviates the problems and disadvantages mentioned above. Thereto, the invention provides a lighting device comprising a transmitter, a controller and a sensor; wherein the controller is configured to control the transmitter to repeatedly transmit a second wireless message interleaved with a first wireless message, wherein the first wireless message has a first duration and comprises a first signal, wherein the second wireless message has a second duration and comprises a second signal; wherein the first duration and/or the second duration is adaptive during a lifetime of the lighting device; wherein the controller is configured to receive a measurement from the sensor and control the transmitter to transmit the second wireless message comprising the second signal comprising the measurement.

Thus, the lighting device according to the invention comprises a transmitter and a controller configured to control the transmitter to repeatedly transmit the second wireless message (comprising the second signal) and the first wireless message (comprising the first signal) interleaved with each other. Therefore, the present invention provides a lighting device arranged for transmitting a first wireless message during a first duration, which first wireless message is then interrupted by the transmittal of a second wireless message for a second duration. Hence, looking in time, the first wireless message comprising the first signal is periodically interrupted by the second wireless message comprising the second signal, which renders an alternating overall wireless message consisting of the first wireless message having a first duration and the second wireless message having a second duration.

As a result, two wireless messages (each comprising its respective signal) may be transmitted by a single transmitter and/or two separate functions may be provided therewith. Since the first wireless message has a first duration and the second wireless message has a second duration, which respective durations are both adaptive during a lifetime of the lighting device, the wireless transmission of information may be controlled accordingly in favor of either the first wireless message or the second wireless message during specific periods in the lifetime of the lighting device.

The lighting device is therefore able to prioritize (or bias) either the first wireless message or the second wireless message in periods during the lifetime of the lighting device. Since in some periods of time during the lifetime of the lighting device it is more favorable to transmit the first wireless message (hence enabling a first function with the first signal) for a longer duration, and since in some periods of time during the lifetime of the lighting device it is more favorable to transmit the second wireless message (hence enabling a second function with the second signal) for a longer duration, possible conflicts in transmitting both the first wireless message and the second wireless message may be reduced and both functions may be enabled simultaneously to a certain extent. This is a clear advantage.

As mentioned, the lighting device comprises a sensor, wherein the controller is configured to receive a measurement from the sensor and control the transmitter to transmit the second wireless message comprising the second signal comprising the measurement. Thereby, the lighting device may advantageously transmit the sensor readings (which may be a second function) periodically interleaved with the first wireless message (which may relate to a more favored first function).

As partly mentioned, said first wireless message may comprise a first function and said second wireless message may comprise a second function. Hence, the first function and said second function may be different, or in different fields of application. Thus, similarly, a function of the first signal and a function of the second signal may be different. The transmitter may also be a transceiver, thereby also having receiving capabilities.

The first and second wireless message comprise a respective first and second signal. The first and/or second signal may be a content item. The first signal and/or second signal may continuously be transmitted during the respective duration of the respective wireless message. Such a signal may for example be an identifier of the lighting device which is repeatedly transmitted (or phrased as: repeated) during the respective duration of the respective wireless message, or e.g. an operational parameter of the lighting device which may be transmitted as a real-time measured value during the respective duration of the respective wireless message.

In an embodiment, the transmitter may be configured to transmit the first wireless message and the second wireless message via one of: VLC, Li-Fi, RF, Bluetooth, ZigBee, UWB, Lo-Ra, or IR. Such wireless communication modalities have proven valuable for lighting devices in the lighting domain. The lighting device according to the invention may therefore be either an indoor lighting device, such as e.g. an office luminaire or a lamp at home, or an outdoor lighting device, such as e.g. a light pole or a spot light (e.g. serving as a beacon).

For example: The first function as mentioned above may relate to providing positioning via said first wireless message and said first signal, e.g. by the first signal providing a unique identifier associated with the location of the lighting device. The second function may relate to providing status information about the lighting device, such as e.g. internal driver temperature, which may be relevant for maintenance purposes.

Considering this example case, it may be desired that the first wireless message is transmitted continuously during a longer period of time in view of the first function of providing positioning. Namely, if the first wireless message with the unique identifier is transmitted during a longer period of time, a receiver may have more time to receive and decode the unique identifier, so as to enable faster and better positioning and/or navigation. Conversely, it may be relevant that the second wireless message is transmitted continuously during a longer period of time in view of the second function of providing status information. Namely, if the second wireless message with the status information about the lighting device such as e.g. internal driver temperature is transmitted during a longer period of time, more accurate data may be received on e.g. the status s of the lighting devices such as the internal thermodynamic when operating the lighting device.

Thus, the lighting device may cope with conflicting interests in transmitting a wireless message in view of providing two different functions simultaneously over time. The present invention thus recognizes an insight that during the lifetime of the lighting device, some functions may be prioritized over others for a specific period of time. For example: during a first day after installation of a lighting device according to the invention, wherein the installation may be the first power-on of the lighting device, it may be more desired to receive status information about the lighting device such as e.g. the internal driver temperature, so as to check whether the installed lighting device operates accordingly. During said first day after installation, the function of positioning may thus be less prioritized. Hence, since the duration of the transmitted wireless messages is adaptive over the lifetime of the lighting device, the lighting device may be configured to transmit the second wireless message comprising (the second signal with) the status information for a longer duration in the first day after installation, and compared thereto for a shorter duration thereafter. As said second wireless message is interleaved with said first wireless message (which is enabling the positioning function with its respective first signal being the unique identifier for localization), the positioning function may still function properly during said first day after installation, albeit at a lesser extent, but still enabling the second function of providing status information about the lighting device to operate optimally.

Hence, in an embodiment, said lifetime may be defined as a period of time between an installation of the lighting device and a failure of the lighting device; and wherein the lifetime of the lighting device may comprise a first period of time and a second period of time; wherein the second duration may be longer than the first duration during the second period of time compared to the first period of time. Thereby, said installation may be defined as a first power-on of the lighting device. Thereby, said failure may be defined as an expected failure. Such an embodiment emphasizes the adaptiveness of the first duration and/or the second duration during the lifetime of the lighting device (as also indicated in the example above). In some embodiments, the second duration may be at least equal to the first duration during the second period of time compared to the first period of time.

Installation may further be phrased as commissioning or initialization. Said failure of the lighting device may be known to the person skilled in the art of lighting. For example, driver failure, burn-outs, flicker, lighting color degradation below regulated standards, etc. Said failure may be defined as an expected failure. Such an expected failure may be predefined according to calculations known to the person skilled in the art of lighting devices, such as e.g. calculations of—and/or predetermined guarantees of burning hours of the lighting device. The expected failure may thus be expressed in burning hours of the lighting device, such as e.g. 10.000 hours, or e.g. at least 10.000 hours, or e.g. at least 8.000 hours.

Lighting device (or luminaire) maintenance (or repair) may require e.g. the identification of the type of lighting device, the components of the lighting device, the settings of the lighting device, the stored quality-control data, and/or the operational history of the lighting device. Communicating such information via either the first and/or second wireless message may therefore be advantageous.

Moreover, in an embodiment, the second period of time may be between eighty percent of the lifetime of the lighting device and said expected failure of the lighting device. Said failure may be phrased and/or understood (as known to a person skilled in the art) as the expected failure; e.g. based on statistics and/or a predetermined lifetime expectancy. The expected failure and/or predetermined lifetime expectancy may for example be expressed in burning hours. Such an embodiment may be advantageous because a particular function associated with the second wireless message may be more favored during the end of the lifetime of the lighting device. For example, the functions of maintenance, serviceability, providing status information, sharing of sensor readings, and/or transfer of settings.

In other embodiments, the second period of time may be between one of: ninety percent, ninety-five percent, or ninety-nine percent of the lifetime of the lighting device and said failure of the lighting device. In similar yet alternative embodiments, the second period of time may be one of: a year, six months, one month, two weeks, or one week before the guaranteed and/or expected lifetime of the lighting device ends and said guaranteed and/or expected end of the lifetime itself.

Moreover, in an embodiment, the second period of time may be between said installation of the lighting device and the first forty-eight hours of the lifetime of the lighting device. Thereby, said installation may be defined as a first power-on of the lighting device. Such an embodiment is advantageous because a particular function associated with the second wireless message may be more favored during the beginning of the lifetime of the lighting device. For example, the functions of providing status information, so as to e.g. check whether installation is done correctly.

In an embodiment, the first period of time may be daytime, and the second period of time may be nighttime. Such an embodiment may be advantageous, because it may allow more prioritization of the second wireless message and its corresponding second function during nighttime, while during daytime more priority may be given to the first wireless message and its corresponding first function. More specifically, in examples, said first wireless message may relate to indoor positioning, which may be relevant during the daytime (e.g. in a retail environment), whereas the second wireless message may relate to operational status data and/or sharing of collected user data, of which the transmission may be relevant during the nighttime (e.g. when a retailer wants to collect relevant data on shopping behavior). In further examples, the second wireless message may also comprise (i.e. as the second signal) sensor readings associated with the lighting device, such as e.g. a camera or microphone associated with the lighting device, so as to provide a receiver with such sensor readings in view of security; because at nighttime a security officer walking the perimeter may be interested in quickly accessing the sensor readings associated with said lighting device by receiving such information via the second wireless message.

In an embodiment, the first signal may comprise an identifier for positioning and/or location-based services. Said positioning may for example be indoor positioning. Such an embodiment may be advantageous because the lighting device may provide such a positioning and/or location-based services functionality during most of the lifetime of the lighting device, but may periodically allow the second signal having a different functionality, e.g. beaconing of maintenance related information or security data captured with sensors associated with the lighting device, to be transmitted.

In an embodiment, the second signal may comprise an installation height of the lighting device. Such an embodiment may be advantageous, because the installation height of the lighting device may be utilized for improving the accuracy of a positioning system, which may on its turn be enabled by e.g. the first wireless message comprising the first signal (e.g. unique identifier for localization). For example, the first signal may comprise an identifier for positioning. A receiver receiving said first wireless message and the first signal may determine its position relative to the lighting device by assessing the identifier (and/or further identifiers of further lighting devices nearby), wherein for the position determination a predetermined installation height of the lighting device may be used. However, such a predetermined installation height of the lighting device may render an error in accuracy, since the real installation height is not known but is estimated. Therefore, because the first wireless message may be used for positioning and because the second wireless message that is interleaved therewith and that comprises the installation height, any receiver in such a positioning system may be able to utilize the correct for the installation height during positioning; thereby rendering improved and more accurate positioning. The duration of the second wireless message may thereby be less than the duration of the first wireless message, such as e.g. ten times less; such that e.g. in time each 10% of the time the lighting device interrupts the transmission of the first wireless message with the unique identifiers to provide a correct installation height to be used during the other 90% percent of the time instead of a predetermined installation height. Alternatively, said duration of the second wireless message may be less than 10% of the duration of the first wireless message. Other suitable ratios of said durations may be envisioned.

In an embodiment, the second signal may comprise operational status information of the lighting device. In a further embodiment, said operational status information of the lighting device may comprise at least one of: temperature, LED voltage, burning hours, dimming level history, driver internal temperature, on/off cycle count, service and/or maintenance alerts, diagnostics history. In another embodiment, the second signal may comprise diagnostics data, sensor data, and/or user-tracking data.

In an embodiment, said sensor may be a camera, a temperature sensor, a light sensor, a microphone, a pressure sensor, a PIR sensor, a microwave sensor, a moisture sensor, a scent sensor, or an RF-receiver, or any combination thereof in e.g. a sensor bundle.

In a further embodiment, the lighting device comprises a driver for driving a light source; wherein the sensor is mounted in the driver and measures a property of the driver. As a driver may be a most critical component for lighting device failure, such a sensor mounted in the driver and measuring a property of the driver may be advantageous.

In a further embodiment, the controller may be configured to increase said second duration if the measurement exceeds a threshold value.

In an embodiment, the lighting device may comprise a light source, wherein the light source is the transmitter. Such an embodiment is advantageous, as it allows the communication of information via Visible Light Communication or Li-Fi.

In an embodiment, the lighting device may comprise a driver for driving a light source, wherein the transmitter may be configured to transmit the first wireless message and the second wireless message via VLC, and wherein the light source is the transmitter. It is a further object of the invention to provide an improved location-based service system, which at least alleviates the problems and disadvantages mentioned above. Thereto, the invention further provides a location-based service system comprising: the lighting device according to the invention; a mobile device comprising a receiver arranged for receiving said first wireless message and said second wireless message, wherein the mobile device is configured to use the first wireless message for a location-based service. In an embodiment, the location-based service system may be an indoor positioning system and the location-based service may be indoor positioning. The advantages and/or embodiments applying to the lighting device according to the invention may also apply mutatis mutandis to the present system according to the invention.

Moreover, in an embodiment, the location-based services system may comprise a maintenance server, wherein the mobile device may be configured to forward said second wireless message to the maintenance server.

It is a further object of the invention to provide an improved method of a lighting device transmitting a signal, such as a lighting device according to the invention. Thereto, the invention provides a method of a lighting device transmitting a message, the method comprising: transmitting repeatedly a first wireless message and a second wireless message, wherein the second wireless message is interleaved with the first wireless message, wherein the first wireless message has a first duration and comprises a first signal, wherein the second wireless message has a second duration and comprises a second signal; wherein the first duration and/or the second duration is adaptive during a lifetime of the lighting device. The advantages and/or embodiments applying to the lighting device according to the invention may also apply mutatis mutandis to the present system according to the invention.

The invention further relates to a computer program product. Hence, the invention provides a computer program product for a computing device, the computer program product comprising computer program code to perform a method of the invention when the computer program product is run on a processing unit of the computing device.

Thus, aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

In aspects of the invention, in a paragraph, there is provided a lighting device comprising a transmitter coupled to a controller; wherein the controller is configured to control the transmitter to repeatedly transmit a second wireless signal interleaved with a first wireless signal, wherein the first wireless signal has a first duration and the second wireless signal has a second duration; wherein the first duration and/or the second duration is adaptive during a lifetime of the lighting device.

In aspects, in a paragraph, the invention may provide: A lighting device comprising a transmitter coupled to a controller; wherein the controller is configured to control the transmitter to transmit a first wireless signal and a second wireless signal; wherein the second wireless signal is interleaved with the first wireless signal at an interleaving frequency; wherein the interleaving frequency is adaptive during a lifetime of the lighting device, said lifetime being defined as a period of time between an installation of the lighting device and a failure of the lighting device.

In an embodiment thereof, the lifetime of the lighting device may comprise a first period of time and a second period of time; wherein the interleaving frequency during the second period of time may be higher than during the first period of time. Further, in an embodiment, the lighting device may comprise a sensor; wherein the controller may be configured to receive a measurement from the sensor and control the transmitter to transmit the second wireless signal comprising the measurement. Further, in an embodiment, the lighting device may comprise a driver for driving a light source; wherein the sensor may be mounted in the driver and measures a property of the driver. Further, in an embodiment, the controller may be configured to increase the interleaving frequency if the measurement exceeds a threshold value.

BRIEF DESCRIPTION OF THE DRAWINGS

The invention will now be further elucidated by means of the schematic non-limiting drawings.

DETAILED DESCRIPTION OF THE EMBODIMENTS

Figure 1A:
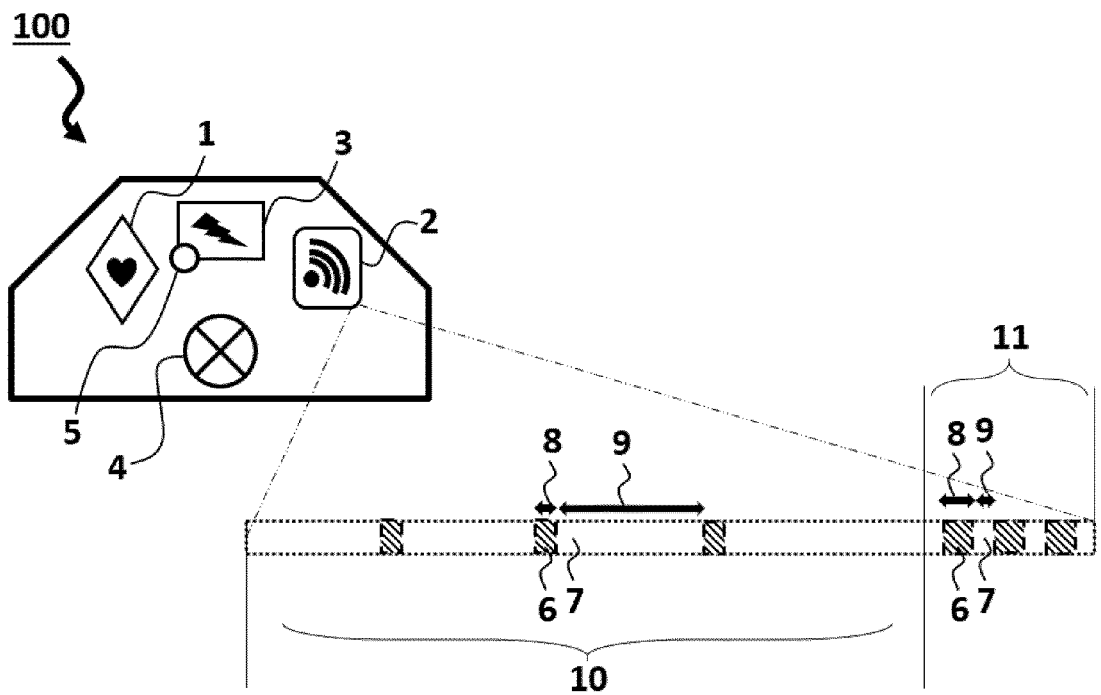
FIGS. 1A, 1B, 1C depict schematically an embodiment of a lighting device and system according to the invention.
Figure 1B:
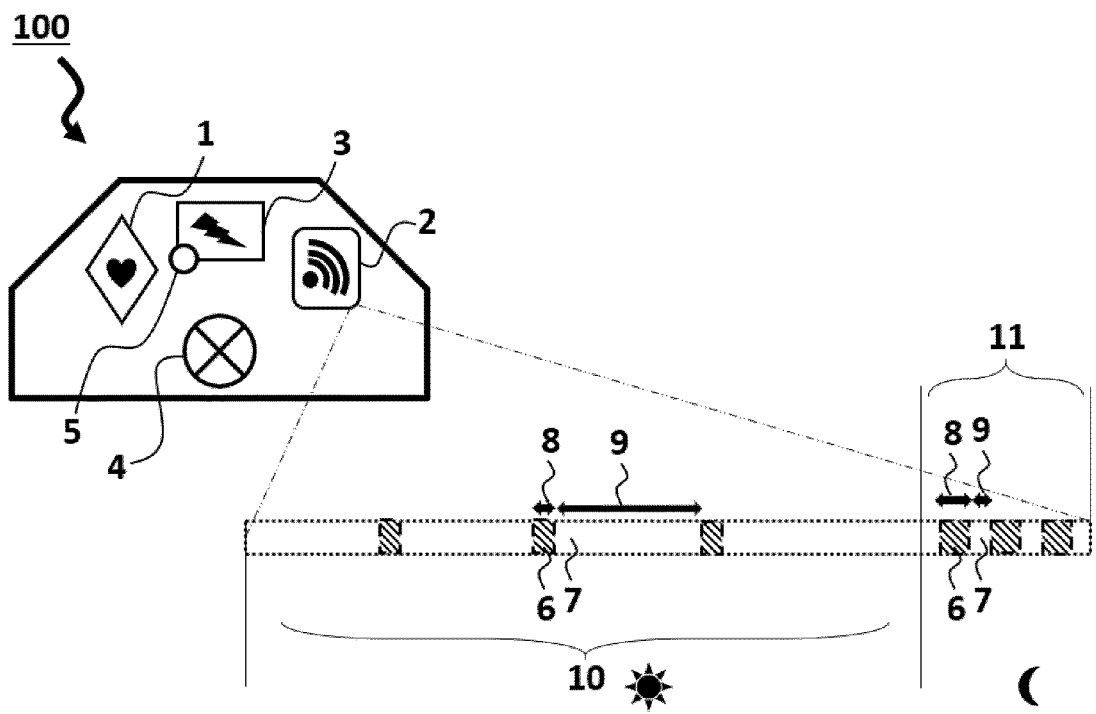
Figure 1C:
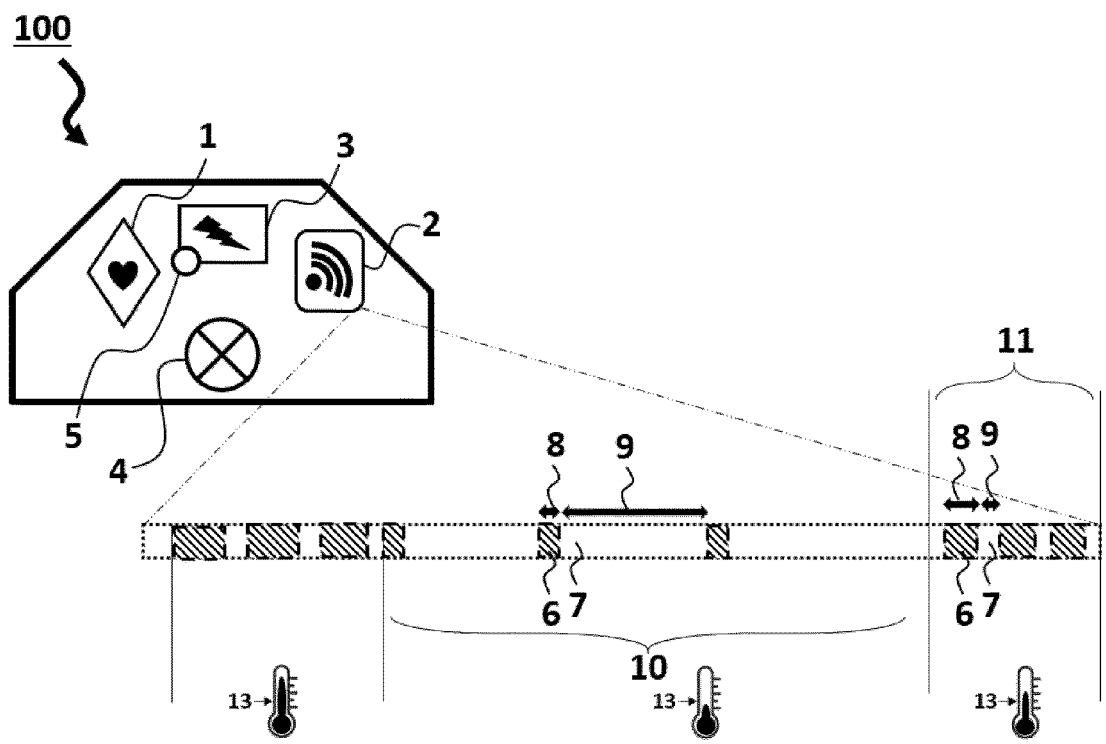

FIG. 1A-C depicts schematically, by non-limiting example, embodiments of a lighting device 100 according to the invention. The lighting device 100 comprises a controller 1, a transmitter 2, a driver 3 and a light source 4. All components are operationally coupled to provide a lighting device 100 with wireless connectivity. The driver 3 drives the light source 4. The controller 1 controls the driver 3 and the transmitter 2.

The lighting device 100 further comprises a temperature sensor 5 for detecting the internal temperature of the driver 3, which is a good indicator for a health and/or a remaining lifetime of a lighting device. The temperature sensor 5 is mounted in the driver 3. The controller 1 is configured to receive measurements from the temperature sensor 5 and store a series of such measurements as measurement data. The measurement data may subsequently be transmitted via the transmitter 2.

Similarly, in alternative embodiments, said temperature sensor may be any other sensing means, which sensing means may be suitable for measuring and/or determining at least one of: a LED voltage, burning hours, a dimming level, a temperature, an on/off cycle count, a service and/or maintenance alert, and/or other diagnostic information. These may all be operational status information of the lighting device.

The transmitter 2 is a Bluetooth transmitter. The transmitter 2 is arranged for a first function of providing a location-based service. Said location-based service is providing a dedicated commercial content item for persons with a receiver in the vicinity of the lighting device 100. A mobile device may comprise such a receiver. Here, the commercial content item is a video of an electric vehicle for sale. Said electric vehicle is thereby positioned under and/or within the illumination footprint of the lighting device 100. Whenever the electric vehicle is sold, and/or another object is positioned below the lighting device 100, the commercial content item may adapt accordingly, e.g. being another video. The lighting device 100 is thereby considered to be used in a retail context.

Alternatively, said Bluetooth transmitter may be a transmitter or a transceiver configured to transmit a wireless signal via the modality of VLC, Li-Fi, RF, Bluetooth, ZigBee, UWB, Lo-Ra, or IR. Yet alternatively, other location-based services may also be envisioned, such as positioning, other advertisement, information supply, touristic guidance, data-exchange, navigation, communication, monetary transaction, verification, security, commissioning, etc.

The transmitter 2 is also arranged for a second function. The second function is transmitting the measurement data. The measurement data is relevant to evaluate the health, serviceability, maintenance and/or the expected lifetime of the lighting device 100. Namely, in a further embodiment (not depicted explicitly), a mobile device within range of the lighting device receives the measurement data transmitted by the transmitter 2 and forwards this measurement data to a maintenance server. The measurement data collected at the maintenance server is then subsequently used to determine servicing, replacement and/or maintenance of the lighting device 100.

Thus, still referring to the embodiments depicted in FIG. 1A-C, the controller 1 is configured to control the transmitter 2 to repeatedly transmit a second wireless message 6 interleaved with a first wireless message 7. The first wireless message comprises a first signal and the second wireless message comprises a second signal. The first wireless message 7 is associated with the first function and comprises, as the first signal, the commercial content item indicated above. The second wireless signal 7 is associated with the second function and comprises, as the second signal, the measurement data indicated above. The first wireless message 7 has a first duration 9. During the first duration 9 the commercial content item as indicated above is repeatedly transmitted. The second wireless message 6 has a second duration 8. During the second duration 8 the measurement data is transmitted.

During the lifetime of the lighting device 100, which lifetime is defined as the period of time between the installation of the lighting device 100 and the failure of the lighting device, the first duration 9 and the second duration 8 is adaptive. Three, non-limiting, embodiments can be distinguished.

Namely, referring to FIG. 1A, the lifetime of the lighting device 100 comprises a first period of time 10 and a second period of time 11. The second duration 8 is longer than the first duration 9 during the second period of time 11 compare to the first period of time 10. Here, the first period of time 10 is the period of time between the installation of the lighting device 100 and eighty percent of the lifetime of the lighting device 100. This may alternatively be e.g. eighty-five percent, ninety percent, or ninety percent. Hereby, the lifetime of the lighting device 10 may be understood as the expected lifetime of the lighting device 100, for example as initially calculated and/or guaranteed burning hours for the specific lighting device (the product). Here, the expected lifetime is 50.000 burning hours, hence the first period of time being eighty-percent thereof, i.e. 40.000 burning hours. Other examples of burning hours may be envisioned based on lighting products on the market. Moreover, the second period of time 11 is the period of time between eighty-percent of the lifetime of the lighting device 100 and the failure of the lighting device 100. Here, this is the expected failure at 50.000 burning hours. As a result, the lighting device 100 transmits more instances of the measurement data (via the second wireless message) during the end of the lifetime of the lighting device 100. This is advantageous, because at the end of said lifetime a better monitoring of the lighting device 100 may be required for purposes of maintenance, serviceability, replacement and/or health checking. At said end of the lifetime of the lighting device 100 the transmission of such measurement data (hence the second function) is increased and the second function prioritized over the first function of providing the commercial content item, though the commercial content item is still being transmitted but for a shorter duration, thereby still allowing two functions to be enabled for a single transmitter 2. Alternatively, in some examples, the second period of time may be during the beginning of the lifetime of the lighting device, so as to e.g. check whether installation is done correctly and the lighting device is able to operate at the right temperatures after installation, e.g. first forty-eight hours.

Namely, referring to FIG. 1B, the lifetime of the lighting device 100 comprises a first period of time 10 and a second period of time 11. The first period of time 10 is daytime, whereas the second period of time is nighttime 11. Therefore, the lighting device 100 prioritizes the first function of providing the commercial content item during the time of day wherein more people are viewing the electric vehicle for sale, whereas the lighting device 100 prioritizes the second function of transmitting the measurement data when less people are viewing the electric vehicle for sale and thereby more time is available to transmit the desired maintenance data without loosing transmitting the commercial content item in the less crowded evening hours. Alternatively, in embodiments, instead of the temperature sensor there may for example be a presence detector, which may share mutatis mutandis security related information during nighttime with a longer second duration compared to daytime.

Namely, referring to FIG. 1C, the controller 1 is configured to assess each measurement of the temperature sensor 5 and compare said measurement to a threshold. If the measurement exceeds a threshold value 13, the controller 1 increases the second duration 8 of the second wireless message 7. Therefore, whenever the internal temperature of the driver 3 becomes critical (i.e. exceeding the threshold which may be set by manual or factory input to the controller), the controller 1 transmits more instances of the measurement data due to the longer second duration 8, thereby allowing the maintenance server as indicated above to collect more relevant data on the operational status of the lighting device 100. The period wherein the second duration 8 of the second wireless message 7 is increased due to the exceeding measurement value of the temperature sensor 5 may also be referred to as the second period of time 11 within the lifetime of the lighting device 100, whereas the period preceding such a second period of time may be considered the first period of time 10 (in which the second duration 8 is consequently lower). Here, albeit optional and not necessary, the second duration 8 is linearly increased with increasing measurement value. Alternatively, other mathematical formulations may be envisioned, such as a cubic increase, or a step increase, or a fixed second duration when the measurement value exceeds the threshold value. As a result, whenever the temperature sensor 5 of the lighting device 100 measures a value indicative of a malfunction, failure, and/or undesired operational conditions, the lighting device 100 may prioritize the transmission of the second wireless signal 6 and thereby the second function of sending measurement data.

Figure 2:
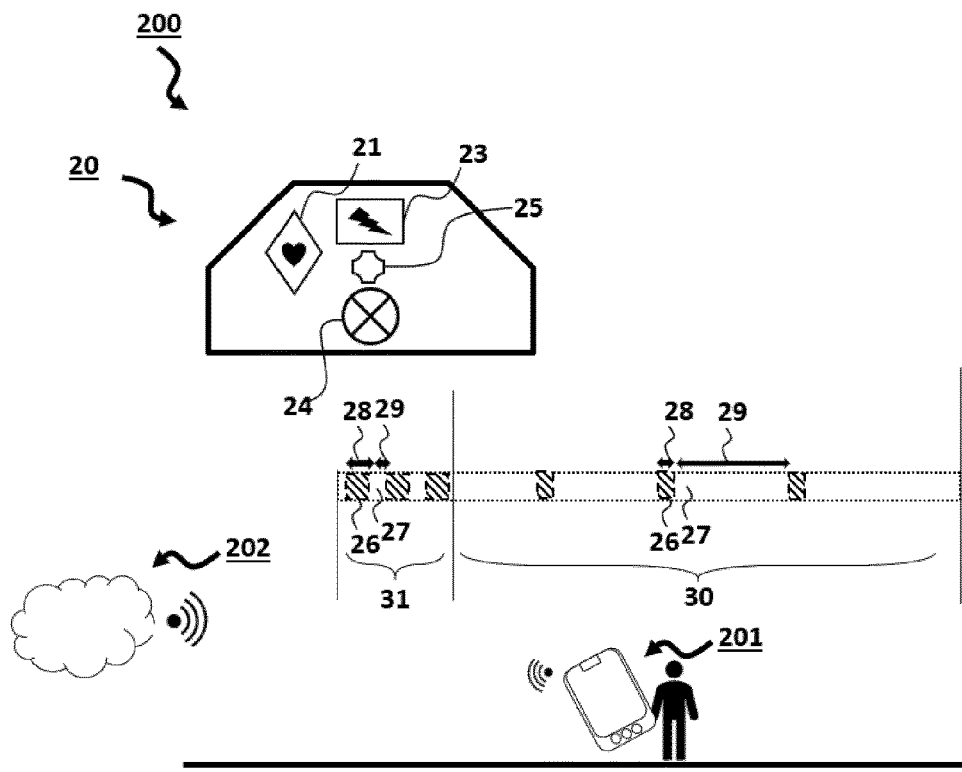
FIG. 2 depicts schematically an embodiment of an indoor positioning system according to the invention.

FIG. 2 depicts schematically, by non-limiting example, an embodiment of a location-based service system 200 according to the invention. The location-based service system 200 is an indoor positioning system. The indoor positioning system 200 comprises a plurality of lighting devices of which only one lighting device 20 is depicted in FIG. 2 for convenience. Said lighting devices may be identical. Said lighting devices are luminaires with LED light sources, but may alternatively be any other lighting device, such as a flood light or spot-light or pixilated spot.

The lighting device 20 comprises a controller 21, a driver 23, a (LED) light source 24, and a sensing means 25 for measuring LED voltage. The light source 24 serves as a transmitter for Visible Light Communication (VLC). The driver 3 drives the light source 4. The controller 1 controls the driver 3 and thereby the light source 24 as a transmitter. The LED voltage is a good indicator whether the lighting device is installed correctly and functions within the correct power regime. All components are operationally coupled. The controller 21 is thereby configured to receive the measurements of the sensing means 25 and output LED voltage data. Alternatively, other sensing means may be envisioned within this embodiment to obtain operational status parameters of the lighting device.

The plurality of lighting devices is installed at an event venue, such as e.g. a stadium, concert hall, shopping mall or indoor hall. The plurality of lighting devices is arranged to provide indoor positioning via VLC, wherein each lighting device emits its own unique identifier. Therefore, the indoor positioning system 200 further comprises a mobile device 201 comprising a receiver, i.e. a camera or alternatively a photodiode. The mobile device 201 receives the unique identifiers the lighting devices within range and determines a location and/or position therewith, as known in the art of Visible Light Communication based Indoor Positioning Systems.

Referring to FIG. 2, said lighting device 20 is configured to provide a first function of VLC based indoor positioning by transmitting the unique identifier associated with the respective lighting device 20. Said lighting device 20 is furthermore configured to provide a second function. The second function is transmitting said LED voltage data, so as to provide venue owners real-time data on the operational status of the lighting device 20, which may be relevant for purpose of verifying the installation. The LED voltage data received by the mobile device 201 is namely forwarded to a cloud server 202 via a wireless connection such as RF, which cloud server 202 stores the collected data throughout the venue and is accessible for e.g. the venue owner.

Still referring to the embodiment depicted in FIG. 2, said controller 21 is configured to control the light source 24 to repeatedly transmit a second wireless message 26 interleaved with a first wireless message 27. The first wireless message comprises a first signal and the second wireless message comprises a second signal. FIG. 2 depicts such wireless messages schematically. The first wireless message 27 is associated with the first function and comprises the transmission of the unique identifiers for indoor positioning indicated above. The second wireless message 27 is associated with the second function and comprises the LED voltage data indicated above. The first wireless message 27 has a first duration 29. During the first duration 29 the unique identifier as indicated above is repeatedly transmitted. The second wireless message 26 has a second duration 28. During the second duration 28 the LED voltage data is transmitted. Thus, when emitting the LED voltage data, a mobile device 201 cannot receive said unique identifier and cannot position accordingly (i.e. at least not in real-time). A conflict occurs between the functions of indoor positioning and providing people count information.

Therefore, according to the invention, during the lifetime of the lighting device 100, which lifetime is defined as the period of time between the installation of the lighting device 100 and the failure of the lighting device, the first duration 29 and the second duration 28 is adaptive. This enables prioritization of the functions of the lighting device.

Thus, since LED voltage data is a suitable parameter for verifying the correct installation of the lighting devices in the venue, it is advantageous that the second duration 28 is longer than the first duration 27 during the first forty-eight hours 31 of the lifetime of the lighting device 20 compared to the remainder 30 of the lifetime of the lighting device 20. This first forty-eight hours 31 of the lifetime of the lighting device is the second period of time (comprised by the lifetime of the lighting device) according to the invention. During this initial period of forty-eight hours 31, the indoor positioning function is still provided, albeit at a lower priority and accuracy, while still being able to verify the correctness of the installation and operation of the lighting devices within the indoor positioning system 200. After this first forty-eight hours 31 of the lifetime, the second duration 28 is shorter than the first duration 29; and consequently, the lighting devices may share their LED voltage data or any alternative operational parameters to a lesser extent, as later in the lifetime of the lighting devices the lighting devices are considered to be installed correctly. Alternatively, said first 48 hours of the lifetime may be one of the first 8 hours, the first 24 hours, the first 72 hours.

In a further embodiment (not depicted), which is partly similar to the above embodiment depicted in FIG. 2, a location-based service system is provided, but wherein now the sensing means is replaced by a camera. The light source thus comprises a camera. The controller is thereby configured to analyze the image recorded by the respective camera and determine a people count. The people count is thereby considered a measurement value of the camera. Alternatively, other parameters may be determined and/or derived from the image recorded by the camera, such as emotions, walking-patterns, identities, etc. Therefore, said lighting device is configured to provide a second function, which is transmitting said people count, so as to provide venue owners real-time data on the crowdedness of the venue, which may be relevant for purposes of safety and/or commerce.

Referring to this further embodiment (not depicted), the lifetime of the lighting device comprises a first period of time and a second period of time. The first period of time is daytime, whereas the second period of time is nighttime. Therefore, the lighting device prioritizes the first function of providing the indoor positioning during the time of day wherein more people are within the venue, whereas the lighting device prioritizes the second function of transmitting the measurement data when less people are at the venue without losing transmitting the function of indoor positioning completely but enabling it to a lesser extent (i.e. shorter duration of transmitting the unique identifier renders a slower indoor positioning, but still sufficient). As a result, for the purposes of security and safety, a security officer patrolling the venue at nighttime may be able to instantly receive all relevant data on people count (or alternative parameters recorded with the camera) whereas during daytime a crowd of people may be provided with fast indoor positioning.

In a further embodiment (not depicted), which is partly similar to the above embodiment depicted in FIG. 2, a location-based service system is provided, but wherein now the second wireless message comprises the installation height of a respective lighting device. By providing the installation height of such a respective lighting device during the first 48 hours of the lifetime of the lighting device, all mobile devices navigating through the venue may receive and store the right installation height, thereby allowing the positioning to be more accurate. As in VLC based indoor positioning position and orientation can be determined, it may be relevant to know the real installation height of a VLC emitting light source accurately instead of using a predetermined proxy value.

Figure 3:
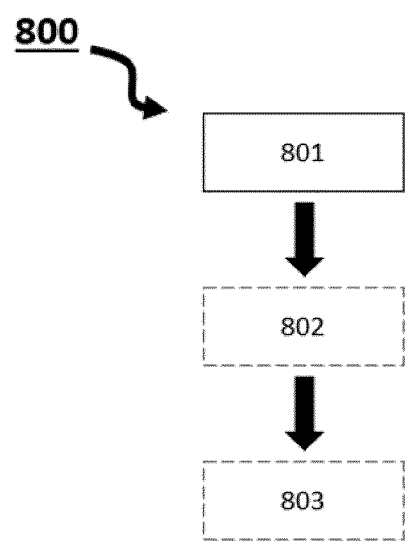
FIG. 3 depicts schematically an embodiment of a method according to the invention.

FIG. 3 depicts schematically, by non-limiting example, a method 800 of a lighting device according to the invention transmitting a signal. The method comprises the step 801 of transmitting repeatedly a first wireless message and a second wireless message, wherein the second wireless message is interleaved with the first wireless message, wherein the first wireless message has a first duration and comprises a first signal, wherein the second wireless signal has a second duration and comprises a second signal; wherein the first duration and/or the second duration is adaptive during a lifetime of the lighting device. The method optionally comprises the step 802 of a mobile device receiving said first wireless message and said second wireless message, so as to provide respectively a first function and/or a second function, as elucidated in the embodiments above. The method optionally comprises the step 803 of forwarding data determined from the first wireless message and/or the second wireless message to a remote server, such as a maintenance server.

The invention claimed is:

1. A lighting device comprising a transmitter, a controller and a sensor;
   wherein the controller is configured to control the transmitter to repeatedly transmit a second wireless message interleaved with a first wireless message, wherein the first wireless message has a first duration and comprises a first signal, wherein the second wireless message has a second duration and comprises a second signal;
   wherein the first duration and/or the second duration is adaptive during a lifetime of the lighting device;
   wherein the controller is configured to receive a measurement from the sensor and control the transmitter to transmit the second wireless message comprising the second signal comprising the measurement.

2. The lighting device according to claim 1, wherein said lifetime is defined as a period of time between a first power-on of the lighting device and an expected failure of the lighting device; and wherein the lifetime of the lighting device comprises a first period of time and a second period of time;
   wherein the second duration is longer than the first duration during the second period of time compared to the first period of time.

3. The lighting device according to claim 2, wherein the second period of time is between eighty percent of the lifetime of the lighting device and said expected failure of the lighting device.

4. The lighting device according to claim 2, wherein the second period of time is between said first power-on of the lighting device and the first forty-eight hours of the lifetime of the lighting device.

5. The lighting device according to claim 2, wherein the first period of time is daytime, and the second period of time is nighttime.

6. The lighting device according to claim 1, wherein the first signal comprises an identifier for indoor positioning and/or location-based services.

7. The lighting device according to claim 1, wherein the second signal comprises an installation height of the lighting device.

8. The lighting device according to claim 1, wherein the second signal comprises operational status information of the lighting device.

9. The lighting device according to claim 8, wherein the operational status information of the lighting device comprises at least one of: temperature, LED voltage, burning hours, dimming level history, driver internal temperature, on/off cycle count, service and/or maintenance alerts, diagnostics history.

10. The lighting device according to claim 1, wherein the lighting device comprises a driver for driving a light source;
    wherein the sensor is mounted in the driver and measures a property of the driver.

11. The lighting device according to claim 1, wherein the controller is configured to increase said second duration if the measurement exceeds a threshold value.

12. The lighting device according to claim 1, wherein the transmitter is configured to transmit the first wireless message and the second wireless message via one of: VLC, Li-Fi, RF, Bluetooth, ZigBee, or IR.

13. The lighting device according to claim 1, wherein the lighting device comprises a driver for driving a light source, wherein the transmitter is configured to transmit the first wireless message and the second wireless message via VLC, and wherein the light source is the transmitter.

14. A location-based service system comprising:
    the lighting device according to claim 1;
    a mobile device comprising a receiver arranged for receiving said first wireless message and said second wireless message, wherein the mobile device is configured to use the first signal of the first wireless message for a location-based service.

15. The location-based service system according to claim 14, wherein the location-based service system comprises a maintenance server, wherein the mobile device is configured to forward the second signal of said second wireless signal to the maintenance server.

* * * * *